United States Patent [19]
Bahnsen

[11] 3,763,366
[45] Oct. 2, 1973

[54] PHOTOGRAPHIC STROBE LIGHT ADAPTER

[76] Inventor: Gerhard I. W. Bahnsen, Box 1297, South Lake Tahoe, Calif. 95705

[22] Filed: Nov. 15, 1971

[21] Appl. No.: 198,526

Related U.S. Application Data

[63] Continuation-in-part of Ser. No. 9,138, Feb. 6, 1970, abandoned.

[52] U.S. Cl. ............... 240/1.3, 95/11 L, 95/11.5 R
[51] Int. Cl. .......................................... G03b 15/02
[58] Field of Search ............ 95/11 R, 11 L, 11.5 R, 95/1 R; 240/1.3, 46.53, 46.55

[56] References Cited
UNITED STATES PATENTS

| | | | |
|---|---|---|---|
| 2,879,377 | 3/1959 | Laying | 240/1.3 |
| 3,386,360 | 6/1968 | Nerwin | 95/11 R |
| 3,491,667 | 1/1970 | Land | 95/11 R |
| 2,727,980 | 12/1955 | Farber et al. | 240/1.3 |

FOREIGN PATENTS OR APPLICATIONS

467,430   2/1969   Switzerland .......................... 240/1.3

*Primary Examiner*—Richard L. Moses
*Attorney*—William P. Green

[57] ABSTRACT

An adapter which can be removably fitted over a photographic flash cube or strobe unit, and which has spaced portions engageable with opposite sides of the cube or strobe unit to locate the adapter relative thereto, with the adapter being constructed to block off a predetermined part but not all of the light emitted by the cube or strobe unit in a relation adapting the cube for proper illumination of a particular subject at a particular distance from the camera.

1 Claim, 12 Drawing Figures

PATENTED OCT 2 1973 3,763,366
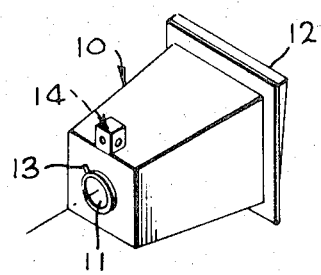
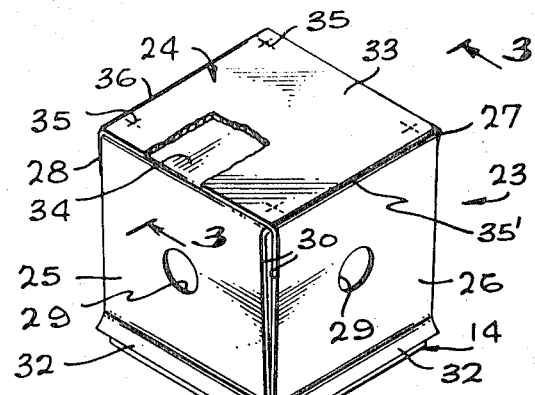
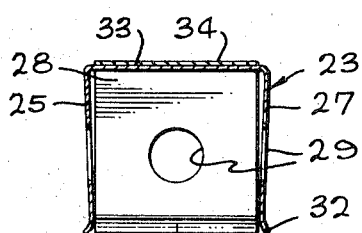
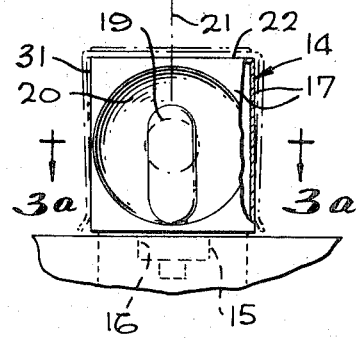
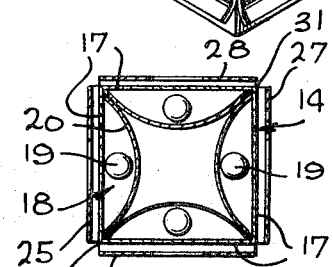
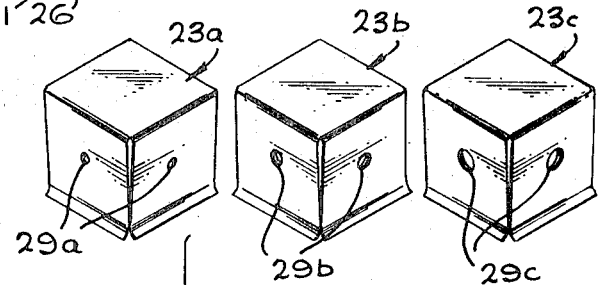
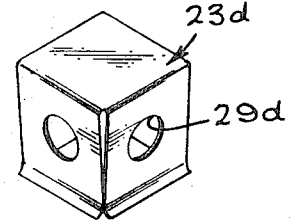
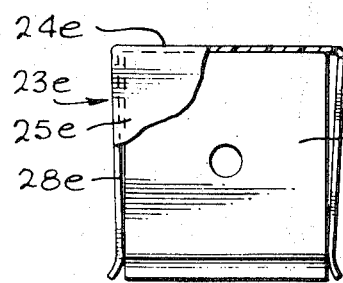
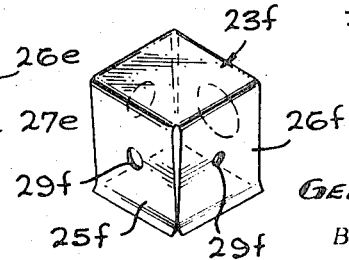
INVENTOR.
GERHARD I. W. BAHNSEN
BY William P. Green
ATTORNEY

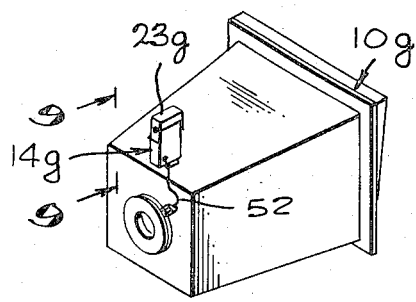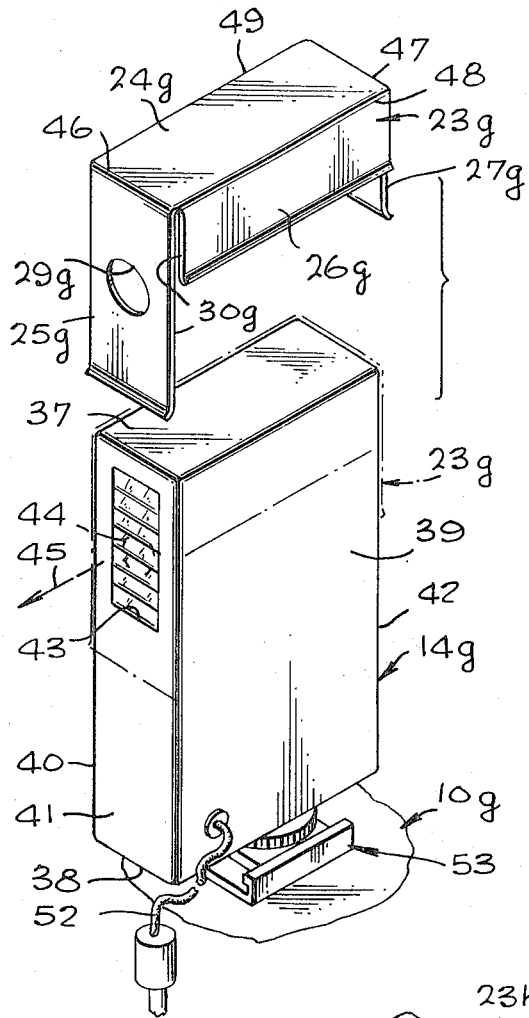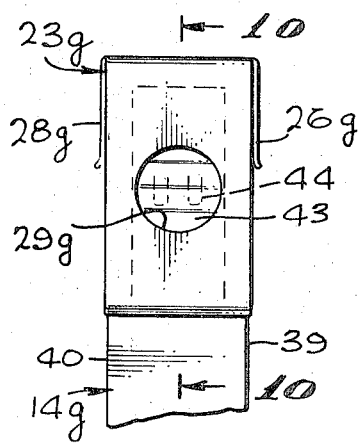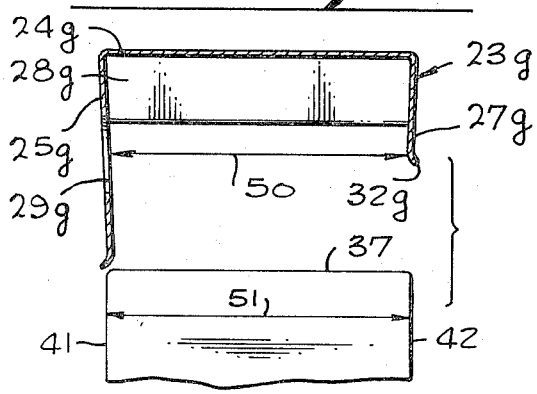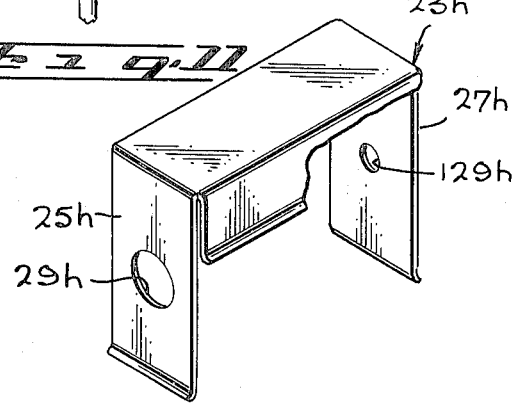

PHOTOGRAPHIC STROBE LIGHT ADAPTER

CROSS REFERENCE TO RELATED APPLICATION

This application is a continuation-in-part of my co-pending application Ser. No. 9138 now abandoned filed Feb. 6, 1970 on "Light Control Adapter for Photographic Flash Cubes."

BACKGROUND OF THE INVENTION

This invention relates to adapters for controlling the amount of light emitted by a photographic flash unit. As will appear, the invention is especially adapted for controlling the light emitted by either a flash cube or a strobe light.

In some photographic situations, it is desirable to employ a camera having fixed focus, fixed lens aperture, and/or fixed shutter time settings in order to simplify the taking of a picture. However, if a flash is to be used with a fixed setting camera of this type, or with a camera which may be adjustable but which is to be used in a particular predetermined condition for simplicity or other reasons, it seldom happens that the amount of light emitted by a standard flash cube or strobe light is of exactly the right intensity for the particular aperture and shutter condition of the camera. As a result, the photographic subject may be grossly over-illuminated or under-illuminated, with resultant over-exposure or under-exposure of the film.

SUMMARY OF THE INVENTION

The present invention provides a unique type of adapter device which may be connected to a flash cube or strobe light or the like, and which will function to reduce the intensity of the flash emitted by the flash unit onto a photographic subject to a predetermined illumination level just sufficient for proper illumination of the subject under certain assumed camera setting conditions. Thus, when a picture is taken with a camera designed for or adjusted to those predetermined settings, and with the camera at a similarly predetermined distance from the object, the flash unit with its adapter device will automatically illuminate the object to exactly the right extent for proper exposure of the film. These results are then repeatable any number of times by a person with no photographic skill, so long as he uses a proper light adapter for the particular camera setting and subject-to-camera distance conditions encountered. As an example, a camera utilizing fixed settings and a fixed subject-to-camera distance, in conjunction with a light adapter embodying the invention, may be employed by law enforcement officers in collecting evidence, such as pictures of tire marks, footprints, and other scene-of-the-crime evidenciary items. In such case, a police officer or other person with little or no photographic skill may take pictures with a camera mounted on a frame structure which inherently holds the camera over the tire mark, footprint, or the like, at a predetermined elevation relative thereto, so that the overall photographic conditions may be substantially completely predetermined. Numerous other similar situations can of course be envisioned in which the use of fixed settings and a fixed distance is of no disadvantage whatever and allows for repeatable optimum photographic results from a person with little photographic knowledge.

An adapter embodying the invention includes a structure which is shaped to be removably fitted over the flash cube or other flash unit and has a portion located for reception in the path of light from the flash unit and constructed to block off a predetermined amount but not all of that light. Preferably, the portion of the adapter which is received in the light path is formed of an opaque material containing an aperture of a predetermined size through which the desired quantity of light from the flash unit can pass. The adapter is constructed to have two spaced portions with inner surfaces engageable with two oppositely facing sides of the cube or strobe unit in a manner at least partially locating the adapter with respect to the flash unit by virtue of such engagement. Desirably, four such portions of the adapter engage four different sides of the unit to locate the adapter relative to the flash unit against movement in either of two generally perpendicular directions.

When the adapter is utilized in conjunction with a flash cube, having a plurality of selectively usable flash cells facing in different directions, the adapter may have a series of different light controlling portions receivable in front of each of the various flash bulbs respectively of the cube, so that as the cube turns progressively for successive use of the different bulbs or cells, the light from each of those cells is controlled in the desired manner to produce a properly illuminated picture. In most instances, the light controlling characteristics of each of these different sides of a particular adapter for flash cube use are identical, since all will normally be used under the same photographic conditions; but it is also contemplated that if desired the different faces of the adapter may have unlike light transmitting characteristics, for use of their respective flash cells or bulbs under predetermined different photographic conditions. For maximum facility in handling, the adapter may be constructed to be slipped downwardly over the top of the flash cube, with four different light passing portions or walls of the adapter being received in front of the four sides of the cube.

BRIEF DESCRIPTION OF THE DRAWING

The above and other features and objects of the invention will be better understood from the following detailed description of the typical embodiments illustrated in the accompanying drawings, in which:

FIG. 1 shows a camera having a flash cube on which a light control adapter embodying the invention is mounted;

FIG. 2 is an enlarged fragmentary perspective view showing especially the adapter of FIG. 1;

FIG. 3 is a reduced vertical section taken on line 3—3 of FIG. 2, but showing the adapter lifted upwardly away from the flash cube;

FIG. 3a is a horizontal section taken on line 3a—3a of FIG. 3;

FIG. 4 shows a set of adapters embodying the invention and each provided with apertures of a different size for use under a series of different photographic conditions;

FIG. 5 is a view similar to the upper portion of FIG. 3, but showing a variational form of adapter embodying the invention;

FIG. 6 shows a variational type of adapter in which each of the different sides has a different size opening;

FIG. 7 is a view similar to FIG. 1, but showing a variational form of adapter designed for use with a strobe light type of flash unit, rather than a flash cube;

FIG. 8 is an enlarged perspective representation of the adapter of FIG. 7, shown separated from the strobe unit;

FIG. 9 is a front view of the strobe unit and adapter, taken on line 9—9 of FIG. 7;

FIG. 10 is a vertical front-to-rear section taken essentially on line 10—10 of FIG. 9, but showing the adapter removed upwardly from the strobe unit; and FIG. 11 is a perspective view of a variational type of adapter for strobe light use having opposite end walls with two different light passing capacities.

DESCRIPTION OF THE PREFERRED EMBODIMENTS

Referring first to FIGS. 1–3a, and especially to FIG. 1, I have illustrated at 10 a camera having a lens 11 for producing an image of a photographic object on a film carried by a film holder 12. For present purposes, it may be assumed that the lens 11 is of fixed focus, to produce an optimum focused picture at a predetermined camera-to-subject distance, and also has a fixed aperture or f number setting. Further, the shutter associated with lens 11, and operable by a shutter actuating element typically illustrated at 13, may have a fixed open shutter time on each actuation, say for example one-fiftieth of a second.

At its upper side, camera 10 removably carries as a flash unit a conventional flash cube 14 (see FIG. 3), having the usual mounting plug 15 projecting downwardly at its underside, and receivable within a mounting socket 16 formed in the upper side of the camera.

As seen best in FIG. 3a, cube 14 is externally square in horizontal section, and has four transparent side walls 17 at different sides, behind each of which there is provided an individual flash cell 18, including a flash bulb 19 and a concave reflector or mirror 20. Socket structure 16 of the camera holds the cube in a position in which a particular one of the walls 17 and its flash cell 18 faces directly forwardly, parallel to the axis 21 of lens 11, to illuminate the photographic subject. On each actuation of the shutter 13, the socket structure 16 electrically fires the forwardly facing one of the cells 18 of the flash cube, following which the socket structure rotates the flash cube about a vertical axis 21 through 90° to face the next successive transparent wall 17 and associated unused flash cell forwardly for the next successive picture. At its upper side, the cube has a horizontal square top wall 22. All of this flash cube structure, and the associated socket structure 16, is of course conventional.

In FIGS. 1–3a, the adapter for the flash cube is illustrated at 23, and is constructed to slip downwardly over and about the flash cube as illustrated in FIG. 2. The adapter may be considered as including a horizontal square top wall structure 24 having four downwardly projecting essentially vertical side walls 25, 26, 27 and 28 which are essentially planar and received in front of and parallel to and closely adjacent the four vertical faces or side walls 17 respectively of the flash cube. Each of the side walls 25, 26, 27 and 28 contains a light passing aperture 29, which may be circular as shown, and is so positioned as to be received in front of the filament of the associated bulb 19, and in front of the center of the associated reflector 20, when the adapter is installed on the cube with the top wall structure 24 contacting the top wall 22 of the cube.

In the arrangement shown in FIGS. 1, 2, 3 and 3a, the four apertures 29 at the four sides of the cube are assumed to be of identical size, shape and position, to each permit passage of the same amount or intensity of light from the associated flash cell to the photographic subject. Further, that predetermined quantity of light is just sufficient to properly illuminate the subject at a predetermined distance from the camera, and with the fixed lens and shutter conditions of lens 11 and its associated shutter. The walls 25, 26, 27 and 28 may be formed of an appropriate opaque material, such as a suitable metal, for example aluminum or steel.

In order to facilitate the connection of the adapter 23 to the flash cube, the four downwardly extending vertical walls 25, 26, 27 and 28 may be unconnected to one another at their vertical edges 30, which extend vertically essentially along the four corners 31 of the cube, and the four walls may then be made of a resilient material which tends by its own resilience to grip inwardly against the sides of the cube, and thus frictionally hold the adapter on the cube. The lower edges 32 of walls 25–28 may be curved slightly outwardly, as shown, far enough to engage the edges of the top wall of the flash cube as the adapter is moved downwardly onto the cube, and deflect the side walls slightly outwardly against their resilience for proper gripping of the cube.

In the arrangement shown in FIGS. 1, 2, 3, and 3a, the adapter is typically constructed of two separate pieces of sheet metal, having top wall portions 33 and 34 which are superimposed one over the other and are appropriately secured together, as by spot welding at 35 (FIG. 2), to form together in composite fashion the previously mentioned top wall structure 24 of the adapter. One of these pieces of sheet metal, typically the one forming wall 33 of FIG. 3, is bent downwardly at two edges 35' and 36 of the cube, to form two of the side walls 26 and 28 of the adapter substantially parallel to one another, and while the second of the top walls (34 in FIG. 3) is turned downwardly at the other two edges of the cube to form the other two side walls 25 and 27 of the adapter, disposed substantially parallel to one another and perpendicular to walls 26 and 28.

In using the apparatus of FIGS. 1, 2, 3, and 3a, when it is desired to take a picture under artificial illumination conditions, the user inserts a flash cube 14 into socket 16 of the camera, and to the position of FIG. 3, and then slips adapter 23 downwardly over the flash cube to a position in which top wall structure 24 is received adjacent and in contact with the upper surface of top wall 22 of the cube, and side walls 25–28 are received adjacent and in front of the various sides 17 of the cube. As the adapter is moved downwardly from its FIG. 3 full line position to its broken line position of installation on the cube, the side walls 25–28 are initially held by their own resilience in the slightly downwardly converging condition of the upper view of FIG. 3, in which the outwardly curved edges 32 are received far enough out to be beyond the four edges of the top wall of the flash cube, to engage those four edges and be cammed outwardly against the resilience of the side walls 25–28, so that the side walls frictionally grip the cube and hold the adapter on it in the manner previously discussed. The camera may then be used under fixed lens, shutter and subject distance conditions, with the appropriately fixed light emission characteristics of the cube determined by the size of apertures 29, to produce an optimum photographic exposure under the particular conditions for which the camera and adapter have been designed. After four pictures have been taken in this manner successively with the four different cells respectively of the flash cube, adapter 23 may be removed from the cube, to allow removal of the cube itself from the camera for replacement by a new unused cube, following which the adapter is placed on this new cube to allow four more pictures to be taken.

If the same camera is to be used under conditions in which one or more of the settings or characteristics of the lens, shutter, etc., are to be varied, a set of differently apertured adapters such as those shown at 23a, 23b, 23c and 23d in FIG. 4 may be provided. Structurally, these four adapters may be identical with the adapter 23 of FIGS. 1, 2, 3, and 3a, except for the provision of apertures of different sizes in the different adapters. That is, the four apertures 29a of adapter 23a may be of a first size, typically very small, as shown, while the four apertures 29b of the second adapter may be of a different size, typicaly slightly larger than the apertures of adapter 23a, and with the apertures of adapters 23c and 23d being of two other still larger sizes. Thus, if for example all of the settings of the camera are to be left the same except that the camera is to be used at four different predetermined distances from the photographic subject, the four adapters 23a–23d may be utilized for properly illuminating the subject at those four different distances respectively. Consequently, the desired simplicity of operation is still attained except for the slight complexity introduced by the use of different camera-to-subject distances, or by introducing one other variable into the essentially fixed set of camera conditions.

FIG. 5 shows a variational form of adapter 23e, which may be considered as identical with adapter 23 of FIGS. 1–3a except that the adapter of FIG. 5 is formed of a single piece of material rather than the two metal strips of the first form of the invention. That is, in FIG. 5, the top wall 24e of the adapter is a single layer of material, having all four of the side walls 25e, 26e, 27e, and 28e formed integrally therewith and extending downwardly therefrom, with these side walls separated at their edges corresponding to the edges 30 of FIG. 2, and being resilient to grip the four sides of the flash cube in the same manner as discussed in connection with the first form of the invention. It is contemplated that the device of FIG. 5 may be molded from an appropriate essentially stiff but resilient resinous plastic material, or may be stamped from a single piece of sheet metal having the desired resilience.

FIG. 6 shows another form of adapter 23f which may be constructed the same as any of the previously discussed forms of the invention except that, instead of having four identically shaped and sized apertures in its four side walls 25f, 26f, etc., the adapter of FIG. 6 has apertures 29f of four different sizes in its four sides. Thus, this single adapter may be turned to different positions for attaining any one of four different predetermined light controlling or passing characteristics.

FIGS. 7 through 10 show another variational form of the invention in which the light control adapter 23g is specifically designed for use in conjunction with a conventional electronic strobe light type of flash unit 14g, rather than the flash cube type of unit illustrated in FIGS. 1 through 6. This unit 14g may be connected to and project upwardly from the upper side of a camera 10g which may have the same fixed focus, fixed aperture and fixed shutter time characteristics as have been discussed in conjunction with camera 10 of FIG. 1.

The strobe unit 14g may have the usual rectangular shape, defined by parallel generally horizontal top and bottom walls 37 and 38, two spaced parallel opposite side walls 39 and 40 disposed perpendicular to top and bottom walls 37 and 38, and two front and rear walls 41 and 42 which are parallel to one another and perpendicular to each of the other walls 37, 38, 39, and 40, with all of these walls 37 through 42 being rectangular as shown. In the upper portion of front wall 41, there is formed a window 43 having an appropriate rectangular light passing glass mounted therein, with an electronic flash bulb or flash source 44 positioned behind the window to emit light forwardly therethrough in the general direction indicated by arrow 45 in FIG. 8. An appropriate reflector is positioned behind the light source 44, to reflect substantially all of the emitted light forwardly through the window, for illumination of a subject to be photographed by camera 10g.

The light adapter 23g is constructed to also be substantially rectangular in shape, and to fit downwardly over the upper portion of light unit 14g, in closely fitting relation, and in a manner very similar to the manner in which the adapters of FIGS. 1 through 6 fit downwardly over their coacting flash cubes. More particularly, adapter 23g has a rectangular planar top wall 24g of a size corresponding substantially to the size of top wall 37 of the strobe unit, and adapted to engage downwardly thereagainst in locating relation. Extending downwardly from the parallel front and rear edges 46 and 47 of top wall 24g, the adapter 23g has a pair of essentially parallel planar front and rear walls 25g and 27g, which fit closely against and engage the front and rear walls 41 and 42 respectively of flash unit 14g. Similarly, extending downwardly from the two parallel opposite side edges 48 and 49 of top wall 24g, the adapter 23g has two rectangular parallel desirably planar opposite side walls 26g and 28g spaced in correspondence with and adapted to engage the opposite sides 39 and 40 of the flash unit. As will be apparent, all four of the downwardly extending walls 25g, 26g, 27g, and 28g preferably extend substantially perpendicular to top wall 24g, and the front and rear walls 25g and 27g preferably are disposed substantially perpendicular to the side walls 26g and 28g. These various walls of the adapter 23g may either be formed of a plurality of interconnected pieces of sheet metal or other material, as in FIGS. 1 through 4, or more preferably of a single piece of metal or the like as in FIG. 5, with the four downwardly extending walls 25g, 26g, 27g, and 28g being bent downwardly from the same piece of material from which top wall 24g is formed, and with the four downwardly projecting walls having their vertical edges 30g free of interconnection and free for relative movement as discussed in connection with FIG. 2. Also as in the cube mounted forms of the invention, the two pairs of spaced vertically extending walls of the adapter 23g may be resilient and initially deformed slightly inwardly to positions in which the spacing therebetween is less than the corresponding dimension of strobe unit 14g, so that all four of the vertical walls of the adapter must be deformed or spread slightly against their resilience when the adapter is fitted onto the strobe unit, to thereby resiliently grip all four sides of the strobe unit in effective holding and locating relation. This feature is brought out for example in FIG. 10, in which the front and rear walls 25g and 27g are shown in the normal positions to which they tend to return by their own resilience, and in which they converge slightly as they advance downwardly to present a dimension 50 therebetween which is slightly less than the corresponding front-to-rear dimension 51 of the strobe unit between its front and rear walls 41 and 42. The same relationship occurs between the two side walls 26g and 28g of the adapter, which in their normal conditions to which they tend to return by their own resilience converge slightly toward one another as they advance downwardly, and to a dimension slightly less than the width dimension of strobe unit 14g between its opposite side walls 39 and 40. The lower edges 32g of all of these vertical walls 25g, 26g, 27g and 28g of adapter 14g curve slightly outwardly as shown in FIG. 10, to a spacing greater than the corresponding dimension of the strobe unit (e.g., dimension 51 in FIG. 10) so that upon downward movement of the adapter the walls 25g, 26g, etc., will be cammed apart to properly engage the sides of the strobe unit by virtue of contact of edges 32g with the top.

The aluminum or other material from which the adapter 23g is formed is opaque, and the front wall 25g is of a size to extend entirely across the area of flash window 43, to block off the emission of light forwardly from the strobe unit except at the location of an aperture 29g formed in wall 25g. This aperture is typically and desirably located directly in front of the flash element 44, and preferably is circular as shown. The size of aperture 29g is accurately predetermined to pass to the photographic subject only a predetermined amount of light which is the optimum for the particular fixed camera settings being employed. The rear walls 27g of the adapter may typically be somewhat shorter vertically than front wall 25g, and the side walls 26g and 28g may be even shorter vertically than the rear wall, all as shown in the drawing.

In using the adapter of FIGS. 7 through 10, the photographer merely slips the adapter downwardly from the FIG. 8 position onto the upper end of strobe unit 14g, and to a position in which engagement of top wall 24g with the top 37 of the strobe unit prevents further downward movement of the adapter, and the resilient engagement of the four vertical walls of the adapter with the four sides of the strobe unit locate the adapter against movement in any horizontal direction, so that aperture 29g is frictionally held in an accurately located position relative to the flash element 44 and window 43. When it is desired to take a picture without use of the adapter, the photographer merely pulls the adapter upwardly off of the strobe unit, and can then take a picture with emission of full light from the flash source. Alternatively, other adapters identical with that shown at 23g in FIGS. 7 to 10, but having different size apertures 29g, may be substituted to pass a different but still accurately controlled and predetermined amount of light from the flash to the photographic subject.

FIG. 11 shows another variational type of adapter 23h which may be considered as identical with the adapter 23g of FIGS. 7 to 10, except that both of the front and rear walls 25h and 27h corresponding to walls 25g and 27g of FIG. 8, are provided with apertures 29h and 129h, desirably of different sizes, so that the adapter may be placed on the strobe unit 14g in either of two positions in which either of the two walls 25h or 27h is received in front of the flash emitting window 43 of FIG. 8. To thus change position of the adapter 23h, this adapter is merely lifted off of strobe unit 14g, then rotated through 180° about a vertical axis to a reversed position, and then slipped downwardly about the strobe unit again, with the second of the two end walls in operative position in this instance. Both of the end walls of course extend downwardly far enough to cover window 43, or to cover a predetermined portion of that window, with the light passing characteristics of the apertures 29h and 129h being predetermined to give different precisely controlled amounts of illumination to the photographic subject, and thereby adapt the strobe unit for two preset camera conditions in addition to a third condition in which the adapter is entirely removed and full emission of the light from the flash is permitted.

The charging and firing of the strobe unit 14g are of course effected in conventional manner and will not be discussed in detail. Suffice it to say merely that the strobe unit contains an appropriate battery and capacitor which can be charged from the battery under the control of a suitable switch on the strobe unit, and which capacitor is automatically discharged to energize flash element 44 in synchronization with the opening of the camera shutter. The battery and capacitor and associated circuitry are contained within strobe unit 14g, and are synchronized to the shutter by an appropriate electrical connection represented at 52. The strobe unit may be detachably mounted to the camera by a conventional bracket structure illustrated generally at 53.

While certain specific embodiments of the present invention have been disclosed as typical, the invention is of course not limited to these particular forms, but rather is applicable broadly to all such variations as fall within the scope of the appended claims.

I claim:

1. A light control adapter for use with a photographic strobe light flash unit which has a generally rectangular top wall and a plurality of side walls and is constructed to emit a flash in a predetermined direction for instantaneously illuminating a photographic subject; said adapter being shaped to fit closely over the flash unit and having a generally rectangular top wall and four side walls connected at their upper edges to said top wall and having their side edges free of direct attachment to the corresponding edges of adjacent side walls to form a slit therebetween, said side walls projecting downwardly therefrom essentially perpendicular to said top wall, said side walls of one pair being spaced apart farther than the side walls of the other pair so that the adapter fits closely and frictionally on the generally rectangularly shaped strobe light flash unit, one opposing pair of side walls extending downwardly beyond the side walls of the other pair, said side walls have flaring camming portions near their lower edges which are engageable with said flash unit in a relation deflecting opposite ones of said side walls relatively apart against their resilience as said adapter is moved onto said flash unit, and at least one of said side walls being formed of opaque material and having an aperture generally at the center of its horizontal width to pass only a predetermined reduced portion but not all of the light from said unit to a photographic subject.

* * * * *